United States Patent [19]

Kanazawa

[11] Patent Number: 4,658,927
[45] Date of Patent: Apr. 21, 1987

[54] STEERING SYSTEM FOR VEHICLE

[75] Inventor: Hirotaka Kanazawa, Hiroshima, Japan

[73] Assignee: Mazda Motor Corporation, Hiroshima, Japan

[21] Appl. No.: 798,864

[22] Filed: Nov. 18, 1985

[30] Foreign Application Priority Data

| Nov. 19, 1984 | [JP] | Japan | 59-244212 |
| Nov. 19, 1984 | [JP] | Japan | 59-244215 |
| Nov. 19, 1984 | [JP] | Japan | 59-244216 |
| Nov. 19, 1984 | [JP] | Japan | 59-244217 |

[51] Int. Cl.$^4$ .............................................. B62D 5/06
[52] U.S. Cl. ..................................... 180/142; 180/141; 180/79.1
[58] Field of Search ............... 180/142, 141, 132, 79.1, 180/143; 74/338 PS

[56] References Cited

U.S. PATENT DOCUMENTS

| 3,576,228 | 4/1971 | Kasselmann | 180/141 |
| 3,897,846 | 8/1975 | Inoue | 180/142 |
| 4,418,780 | 12/1983 | Ito et al. | 180/79.1 |
| 4,541,499 | 9/1985 | Yanai et al. | 180/142 |

FOREIGN PATENT DOCUMENTS

| 54-10003 | 1/1979 | Japan | 180/143 |
| 58-22452 | 12/1983 | Japan. | |

Primary Examiner—John J. Love
Assistant Examiner—Donn McGiehan
Attorney, Agent, or Firm—Gerald J. Ferguson, Jr.; Michael P. Hoffman; Ronni S. Malamud

[57] ABSTRACT

A steering system for a vehicle comprises a transmission ratio changing mechanism inserted between the steering wheel and dirigible wheels of the vehicle to change the transmission ratio, thereby changing the steering ratio, a vehicle speed detecting means and a controller which receives a vehicle speed signal from the vehicle speed detecting means and controls the transmission ratio changing mechanism so that the steering ratio is reduced as the vehicle speed increases and the rate of change of the steering ratio with the vehicle speed is larger in a low vehicle speed range than in a high vehicle speed range.

12 Claims, 8 Drawing Figures

FIG. I

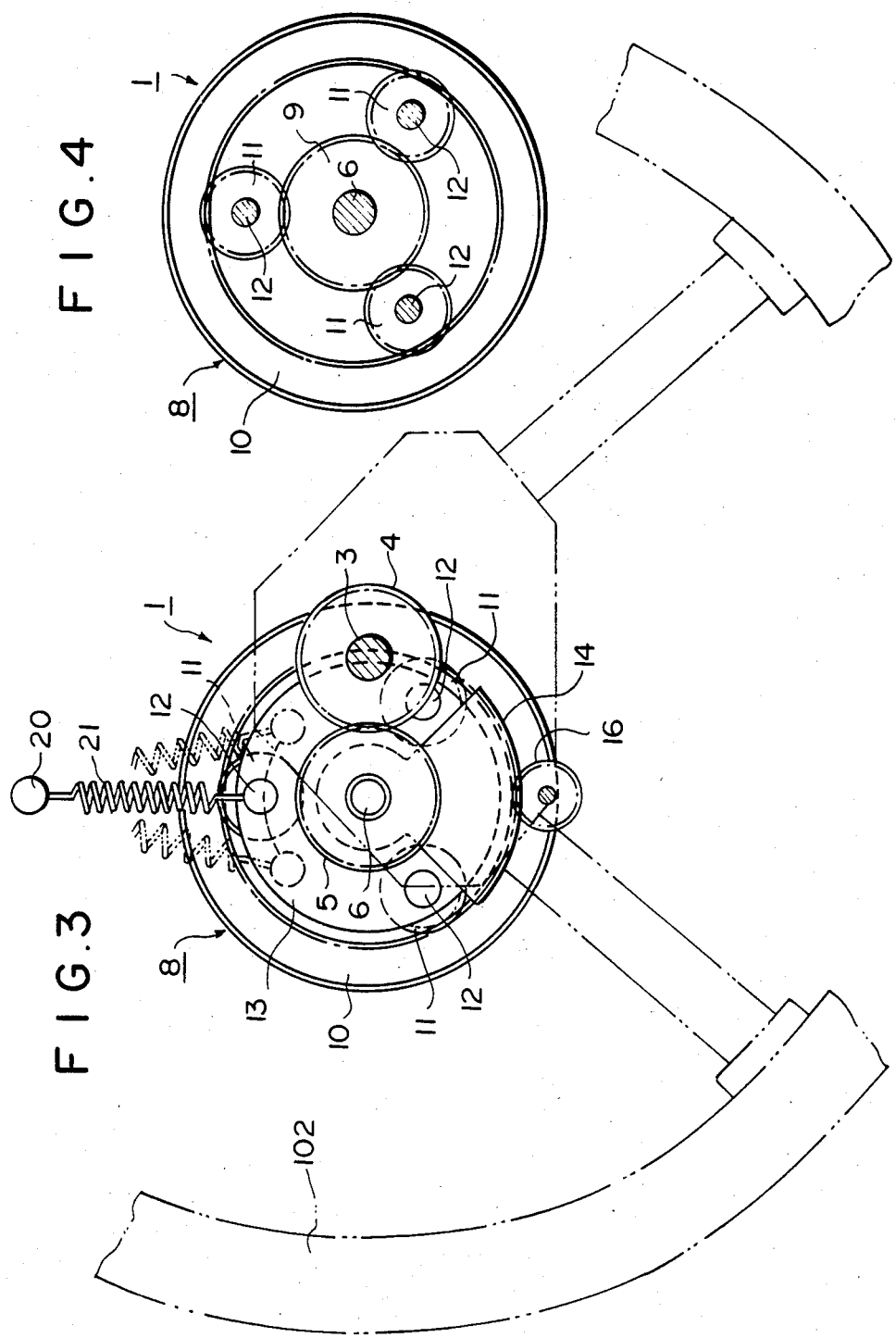

STEERING SYSTEM FOR VEHICLE

BACKGROUND OF THE INVENTION

1. Field of the Invention

This invention relates to a steering system for a vehicle, and more particularly to a variable steering ratio steering system for a vehicle in which the steering ratio or the ratio of the turning angle of the dirigible wheels (generally the front wheels) to the steering angle (the turning angle of the steering wheel) is changed according to the vehicle speed.

2. Description of the Prior Art

In the steering device for a vehicle, rotation of the steering wheel is converted into a lateral movement of the tie rods by way of a steering gear device such as of rack-and-pinion mechanism, and the front wheels connected to the respective tie rods are turned right or left according to the direction of the lateral movement of the tie rods. Conventionally, the steering ratio is generally fixed. However, it is preferred from the viewpoint of running stability that the steering ratio be reduced during high speed travel of the vehicle. On the other hand, it is preferred that the steering ratio be larger when the vehicle speed is low in order to improve response of the vehicle orientation to the operation of the steering wheel or to facilitate driving into a garage or the like.

In Japanese Unexamined Patent Publication No. 58(1983)-224852, there is disclosed a "speed-responsive type steering system" in which the steering ratio is changed according to the vehicle speed. In this steering system, a variable speed gearing comprising a pair of variable pitch pulleys and a V-belt passed around the pulleys is inserted between the steering wheel and the steering shaft, and the pitch diameter of the driven side pulley is increased by a step motor as the vehicle speed increases. Thus, the rotation transmission ratio from the steering wheel to the steering shaft is reduced as the vehicle speed increases so that the steering ratio is reduced as the vehicle speed increases. However, the steering system is disadvantageous in that since the variable speed gearing including the variable pitch pulleys is bulky, the overall size of the system is enlarged, and that there is a possibility that operation of the steering wheel will not be precisely transmitted to the steering shaft or the front wheels due to slippage of the V-belt. Further, when trouble arises in the step motor or the system for controlling the step motor and the step motor becomes incapable of constraining the driven side pulley, the variable speed gearing is held in the neutral position in which the input rotation cannot be transmitted to the output side, whereby steering of the vehicle becomes impossible.

Further, in the speed-responsive steering system disclosed in the aforesaid Japanese unexamined patent publication, the steering ratio is changed linearly with respect to the vehicle speed. In other words, the steering ratio is changed at a fixed rate over the entire vehicle speed range. When the front wheels are turned while the vehicle is running, the vehicle body rolls or yaws due to lateral acceleration. The rolling and yawing of the vehicle body and the lateral acceleration the vehicle body experiences for a given turning angle of the wheels increase exponentially with increase in the vehicle speed. Accordingly, in the speed-responsive steering system in which the rate of change of the steering ratio with respect to the vehicle speed is fixed and the turning angle of the wheels changes by a fixed amount over the entire vehicle speed range when the vehicle speed changes with the steering wheel held at a given angular position, rolling or yawing of the vehicle body is larger in the high vehicle speed range than in the low vehicle speed range, thereby adversely affecting the steering performance of the vehicle especially during cornering at a high speed.

Further, the speed-responsive steering system gives rise to a problem that when the vehicle speed changes during cornering, the turning angle of the front wheels changes even when the steering wheel remains stationary, thereby adversely affecting the running stability. This phenomenon is significant when the steering wheel is turned by a large angle.

SUMMARY OF THE INVENTION

In view of the foregoing observations and description, the primary object of the present invention is to provide a speed-responsive variable steering ratio steering system in which the rate of change of the steering ratio with the vehicle speed is changed with the vehicle speed so that the behavior of the vehicle body caused when the vehicle speed is changed during cornering at a given steering angle is substantially the same over the entire speed range.

Another object of the present invention is to provide a speed responsive variable steering ratio steering system which is compact and in which the steering force can be positively transmitted to the wheels and the steering ratio can be precisely changed according to the vehicle speed.

Still another object of the present invention is to provide a speed-responsive variable steering ratio steering system in which the steering force can be transmitted to the wheels even when trouble occurs with the means for changing the steering ratio.

Still another object of the present invention is to provide a speed-responsive variable steering ratio steering system in which the rate of change of the steering ratio with the vehicle speed is changed with the steering angle so that the change in the turning angle of the front wheels caused by change in the vehicle speed is reduced especially during a sharp turn in which the steering wheel is turned by a large angle, thereby improving the running stability during sharp turns.

Still another object of the present invention is to provide a speed-responsive variable steering ratio steering system in the rate of change of the steering ratio with the vehicle speed is changed with both the vehicle speed and the steering angle.

In a steering system generally comprising a transmission ratio changing means inserted between the steering wheel and dirigible wheels of the vehicle to change the transmission ratio, thereby changing the steering ratio, a vehicle speed detecting means and a controller which receives a vehicle speed signal from the vehicle speed detecting means and controls the transmission ratio changing means to increase the transmission ratio to reduce the steering ratio as the vehicle speed increases, the present invention provides an improved steering system characterized in that said controller is arranged to control the transmission ratio changing means so that the rate of change of the steering ratio with the vehicle speed is larger in a low vehicle speed range than in a high vehicle speed range.

In one preferred embodiment of the present invention, the steering system further comprises a steering angle detecting means and said controller receives a steering angle signal from the steering angle detecting means and controls the transmission ratio changing means so that the rate of change of the steering ratio with the vehicle speed becomes smaller as the steering angle increases.

In one aspect of the present invention, the steering system comprises a transmission ratio changing means which is inserted between the steering wheel and the steering gear device of the vehicle to change the transmission ratio to change the steering ratio and is in the form of a differential gear mechanism having an input gear element connected to the steering wheel, an output gear element connected to the steering gear device and a reaction force gear element; a vehicle speed detecting means; a steering angle detecting means; a controller which receives a vehicle speed signal from the vehicle speed detecting means and a steering angle signal from the steering angle detecting means and outputs a control signal; and an actuator which receives the control signal from the controller and controls rotation of the reaction force gear element to increase the transmission ratio to reduce the steering ratio as the vehicle speed increases.

It is preferred that a spring means for urging the reaction force gear element to the neutral position be provided.

Further it is preferred that the steering gear device be of a variable gear ratio type.

BRIEF DESCRIPTION OF THE DRAWINGS

FIG. 3 is a cross-sectional view taken along line III—III in FIG. 2, FIG. 4 is a cross-sectional view taken along line IV—IV in FIG. 2.

DESCRIPTION OF THE PREFERRED EMBODIMENTS

Figure 1:
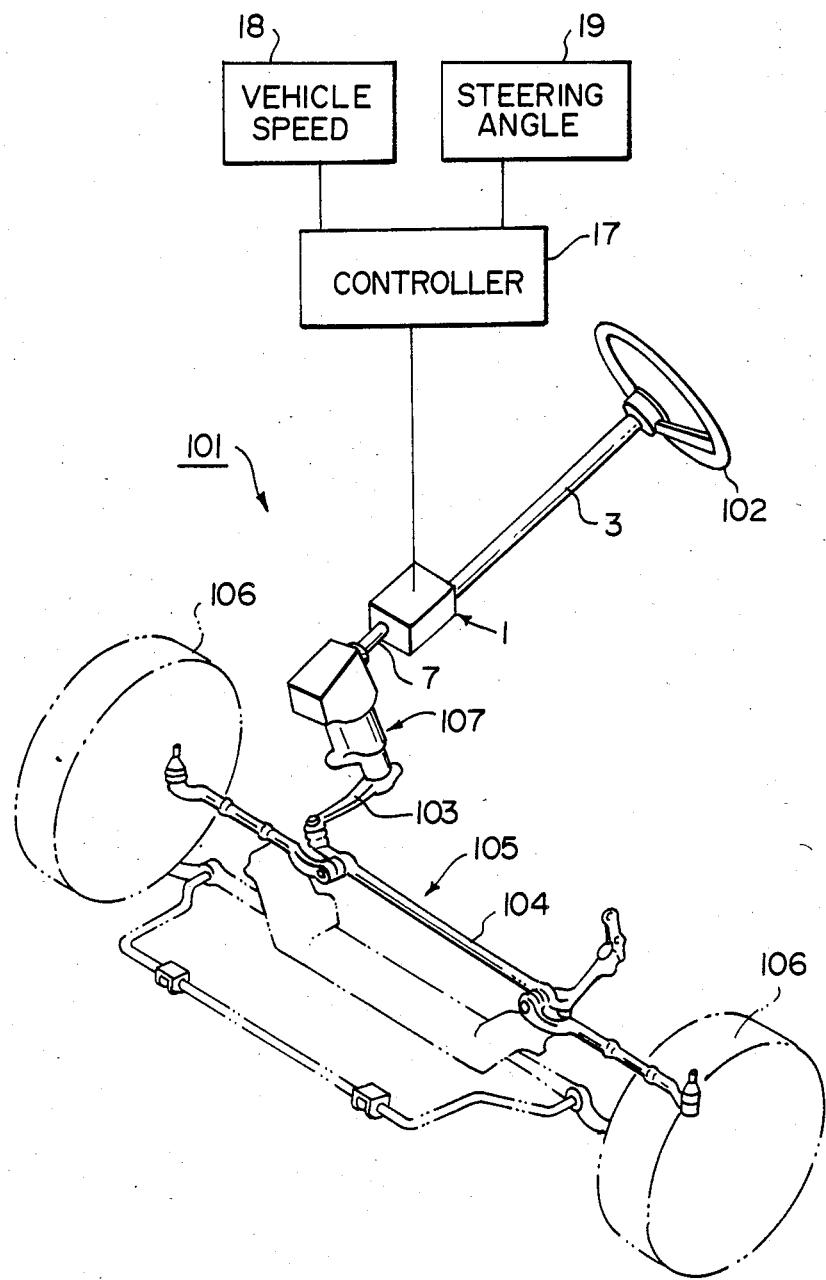
FIG. 1 is a schematic perspective view of a steering system in accordance with an embodiment of the present invention.

In FIG. 1, a steering system 101 in accordance with an embodiment of the present invention comprises a steering wheel 102 connected to the top of a steering shaft 3, a steering ratio changing mechanism 1 operatively connected to the lower end of the steering shaft 3, and a steering gear 107 which is operatively connected with an output shaft 7 (to be described later) of the steering ratio changing mechanism 1 and with the front wheels 106 by way of a link 105 including a pitman arm 103, a tie rod 104 and the like.

Figure 2:
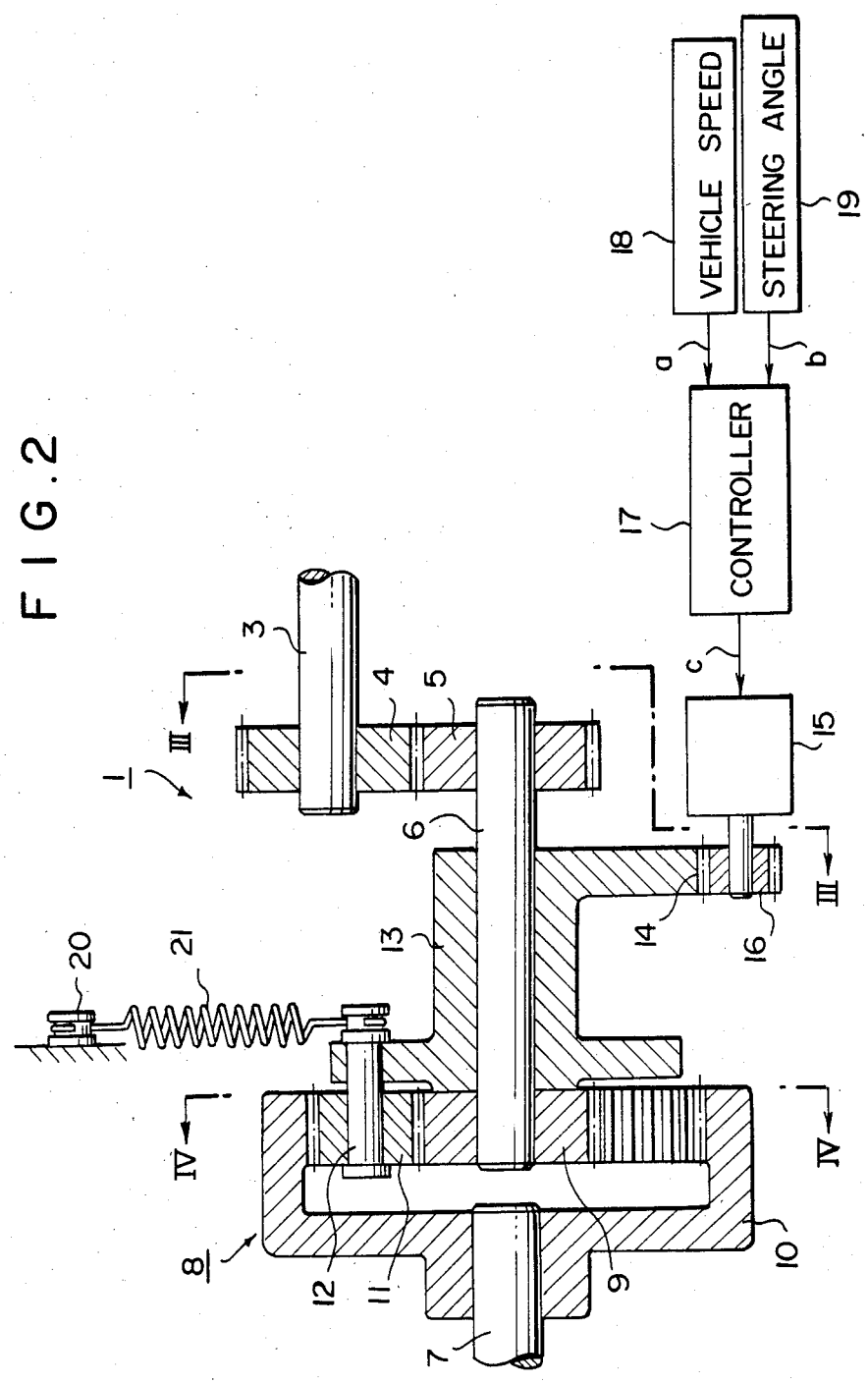
FIG. 2 is a cross-sectional view showing the transmission ratio changing mechanism employed in the steering system of FIG. 1.

The steering ratio changing mechanism 1 comprises, as shown in FIGS. 2 to 4, an input shaft 6 which extends in parallel to the steering shaft 3 and is operatively connected to the steering shaft 3 by way of intermesh of a gear 5 fixed thereto with a gear 4 fixed to the steering shaft 3, the output shaft 7 axially aligned with the input shaft 6, and a differential gear mechanism 8 intervening between the input shaft 6 and the output shaft 7.

The differential gear mechanism 8 is of a planetary gear type and comprises a sun gear 9 fixed to the input shaft 6, a ring gear 10 fixed to the output shaft 7, a plurality of (three in this particular embodiment) planet pinions 11 which are disposed between the sun gear 9 and the ring gear 10 and are equiangularly spaced from each other, and a planet-pinion carrier 13 which supports the planet pinions 11 by way of pinion shafts 12. The planet-pinion carrier 13 is provided with a sector gear 14 formed integrally therewith. The sector gear 14 is in mesh with a pinion 16 fixed to the output shaft of a step motor 15.

Rotation of the step motor 15 is controlled by a controller 17. The controller 17 receives a vehicle speed signal a from a vehicle speed sensor 18 and a steering angle signal b from a steering angle sensor 19 which detects the turning angle of the steering wheel 102, and determines the amount of rotation (including the rotational direction) by which the step motor 15 is to be rotated on the basis of the signals a and b. The controller 17 outputs a control signal c representing the amount of rotation to the step motor 15.

The planet-pinion carrier 13 is urged to the neutral position shown in FIGS. 2 and 3 by a spring 21 which is engaged with one of the pinion shafts 12 at one end and with a pin 20 fixed to a suitable stationary part at the other end.

When the steering wheel 102 is rotated while the vehicle is running, the rotation is transmitted to the input shaft 6 by way of gears 4 and 5 to rotate the sun gear 9. At this time, the controller 17 delivers a control signal c to rotate the step motor 15 according to the vehicle speed and the turning angle of the steering wheel 102 respectively represented by the signals a and b input from the vehicle speed sensor 18 and the steering angle sensor 19, whereby the planet-pinion carrier 13 is rotated by way of engagement of the pinion 16 and the sector gear 14. Accordingly, in the differential gear mechanism 8, the sun gear 9 is rotated by an amount proportional to the turning angle of the steering wheel 102 and at the same time, the planet-pinion carrier 13 is rotated by an amount corresponding to the rotation of the step motor 15. Therefore, the ring gear 10 and accordingly the output shaft 7 are rotated by the amount obtained by subtracting the amount by which the planet carrier 13 is rotated from the amount by which the sun gear 9 is rotated, or by the amount obtained by adding the former to the latter, depending on the direction of the rotation of the planet-pinion carrier 13. The front wheels 106 are rotated by way of the steering gear device 107 by an amount corresponding to the amount of rotation of the output shaft 7. That is, by controlling the amount of rotation of the step motor 15, the rotation transmission rate between the input shaft 6 and the output shaft 7, i.e., the angle by which the output shaft 7 is rotated when the input shaft 6 is rotated by a unit angle can controlled and accordingly the steering ratio or the ratio of the angle by which the front wheels 106 are turned when the steering wheel 102 is turned by a given angle to the given angle can be controlled. Accordingly, the steering ratio can be changed in various manners by selecting the relation of the output of the controller 17 to the inputs from the vehicle speed sensor 18 and the steering angle sensor 19, i.e., the vehicle speed signal a and the steering angle signal b. The steering ratio may be changed depending upon solely the vehicle speed or upon both the vehicle speed and the turning angle of the steering wheel 102.

Figure 5:
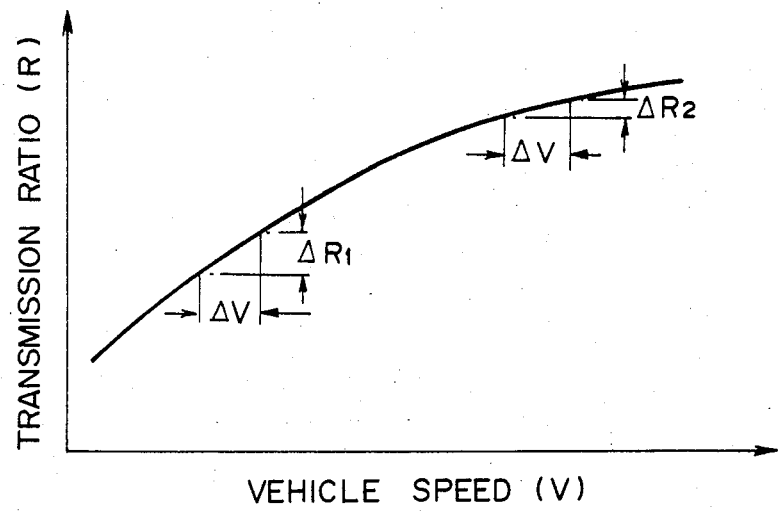
FIG. 5 is a view showing an example of the characteristics according to which the controller controls the transmission ratio changing mechanism in the steering system shown in FIG. 1.

For example, the rotational transmission ratio or the steering ratio may be changed with change in the vehicle speed so that the rate change of the steering ratio is reduced as the vehicle speed increases as shown in FIG. 5. That is, when the vehicle speed-transmission ratio characteristics are set as shown by the characteristic curve in FIG. 5, the rate of change in the transmission ratio ($\Delta R$) for a given amount of change in the vehicle speed ($\Delta V$) becomes smaller as the vehicle speed increases. (The rate of change in the transmission ratio at a low vehicle speed is denoted by $\Delta R1$ and the rate of change in the transmission ratio at a high vehicle speed is denoted by $\Delta R2$ in FIG. 5.)

This arrangement is advantageous in that the behavior of the vehicle body caused when the vehicle speed is changed during cornering at a given steering angle becomes substantially uniform over the entire speed range. That is, when the front wheels are turned while the vehicle is running, the vehicle body rolls or yaws due to the lateral acceleration. The rolling and yawing of the vehicle body and the lateral acceleration the vehicle body experiences for a given turning angle of the wheels increase exponentially with increase in the vehicle speed. Accordingly, if the rate of change of the steering ratio with respect to the vehicle speed is fixed and the turning angle of the wheels changes by a fixed amount over the entire vehicle speed range when the vehicle speed changes with the steering wheel held at a given angular position, rolling or yawing of the vehicle body is larger in the high vehicle speed range than the low vehicle speed range, thereby adversely affecting the steering performance of the vehicle especially during cornering at a high speed, as described above. By changing the rate of change of the steering ratio as shown in FIG. 5, the behavior of the vehicle body caused when the vehicle speed is changed during cornering at a given steering angle can be made substantially uniform over the entire speed range.

The transmission ratio-vehicle speed characteristics shown in FIG. 5 can be obtained in the following manner, for instance.

When the steering angle (the turning angle of the steering wheel), the turning angle of the wheels and the transmission ratio (or the speed reduction ratio) are respectively represented by $\theta h$, $\theta w$ and R ($R=\theta h/\theta w$), and the vehicle speed, the wheel base and the stability factor are respectively represented by V, 1 and A, the lateral acceleration G during a steady circular cornering is represented by the following formula.

$$G = V^2 \cdot \theta w / [l(1+AV^2)]$$

Accordingly, the gain Ga of the lateral acceleration G for a given steering angle $\theta h$ (Ga=G/$\theta h$) is represented by the following formula.

$$Ga = V^2 \cdot \theta w / [\theta h \cdot l(1 + AV^2)]$$
$$= V^2 / [R \cdot l(1 + AV^2)]$$

The transmission ratio R can be represented by the following formula.

$$R = V^2/[Ga.1(1+AV^2)]$$

Therefore, in order for the gain Ga of the lateral acceleration G to be constant irrespective of the vehicle speed, the transmission ratio R must be represented by the following formula (I).

$$R = V^2/(\alpha + \beta V^2) \ldots \quad (I)$$

wherein $\alpha$=Ga.1 (a positive constant) and $\beta$=Ga.1.A (a positive constant).

By determining the transmission ratio-vehicle speed characteristics (according to which the controller 17 controls the step motor 15) on the basis of the formula (I), the lateral acceleration acting on the vehicle body during cornering with the steering wheel 102 fixed at a given angular position can be made substantially constant irrespective of the vehicle speed.

Instead of the formula (I), the following formula (II) which is an approximation of the formula (I) may be used.

$$R = \alpha' \cdot V^n + \beta' \ldots \quad (II)$$

($\alpha'$, $\beta'$: positive constants, $0<n<1$)

In order to make the yaw rate constant substantially over the entire speed range, the transmission ratio-vehicle speed characteristics are determined as follows.

The gain Gb of the yaw rate $\psi$ for a given steering angle $\theta h$ (Gb=$\psi/\theta h$) is represented by the following formula.

$$Gb = (V \cdot \theta w/\theta h)/l(1 + AV^2)$$
$$= V/R \cdot l \cdot (1 + AV^2)$$

Here the transmission ratio R can be represented by the following formula.

$$R = V/[Gb.1(1+AV^2)]$$

Therefore, in order for the gain Gb of the yaw rate $\psi$ to be constant irrespective of the vehicle speed, the transmission ratio R must be represented by the following formula (III).

$$R = V/(\gamma + \delta V^2) \ldots \quad (III)$$

wherein $\gamma$=Gb.1 (a positive constant) and $\delta$=Gb.1.A (a positive constant).

The formulas (I), (II) and (III) cannot be applied in the very low vehicle speed range since in the very low vehicle speed range, the change in the transmission ratio R is too large to control the transmission ratio, and at the same time, the transmission ratio R is too small to obtain.

Figure 6:
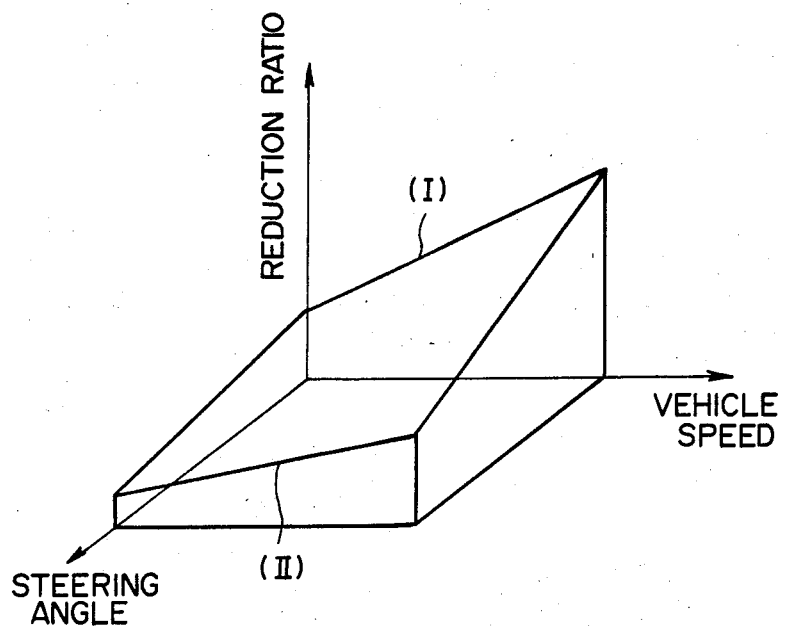
FIG. 6 is a view showing another example of the characteristics according to which the controller controls the transmission ratio changing mechanism in the steering system shown in FIG. 1.

The rotational transmission ratio or the steering ratio may be changed both with change in the vehicle speed and with change in the steering angle, as shown in FIG. 6. In FIG. 6, the transmission ratio (the speed reduction ratio) is increased as the vehicle speed increases and reduced as the steering angle increase, and at the same time, the rate of change of the transmission ratio with the vehicle speed is reduced as the steering angle increases as can be understood from a comparison of the lines (I) and (II) in FIG. 6. Accordingly, the turning angle of the front wheels 106 for a given turning angle of the steering wheel 102 (the steering ratio) becomes smaller as the vehicle speed becomes higher or the steering angle is smaller, whereby an excellent running stability at high speed can be assured, and becomes larger as the vehicle speed becomes lower or the steering angle is larger, whereby the response of the vehicle to the operation of the steering wheel can be improved. Further, since the rate of change in the speed reduction rate is reduced as the steering angle increases, the rate of change in the turning angle of the front wheels 106 with change in the vehicle speed at a given steering angle is reduced as the steering angle increases. Accordingly, the turning angle of the front wheels 106 changes only by a small amount with change in the vehicle speed during a sharp cornering, thereby the stability during sharp cornering can be assured.

Figure 7:
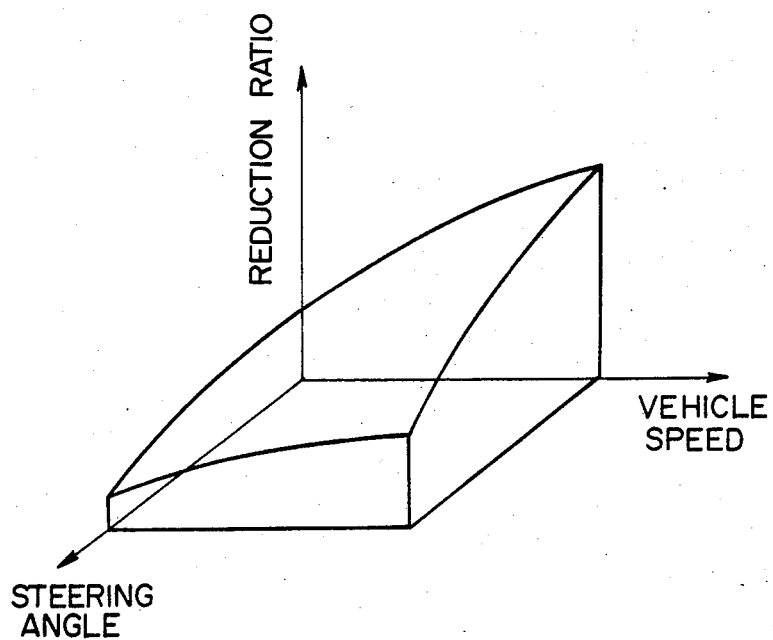
FIG. 7 is a view showing still another example of the characteristics according to which the controller controls the transmission ratio changing mechanism in the steering system shown in FIG. 1.

It is preferred that the rate of change of the speed reduction ratio be reduced as the vehicle speed increases as shown in FIG. 7 so that the effect described above in conjunction with FIG. 5 can be enjoyed in addition to the effect described in conjunction with FIG. 6.

The relation of the speed reduction ratio to the vehicle speed and the steering angle shown in FIG. 7 can be given by the following formula, for instance.

$$R = aV^n + \beta - \gamma\theta^m$$

wherein R, V and $\theta$ respectively represent the speed reduction ratio (transmission ratio), the vehicle speed and the steering angle, and $\alpha$, $\beta$ and $\gamma$ respectively represent positive constants, n being $0 < n < 1$, and m being $m = aV^k + b > 0$ (a, b, k > 0).

Figure 8:
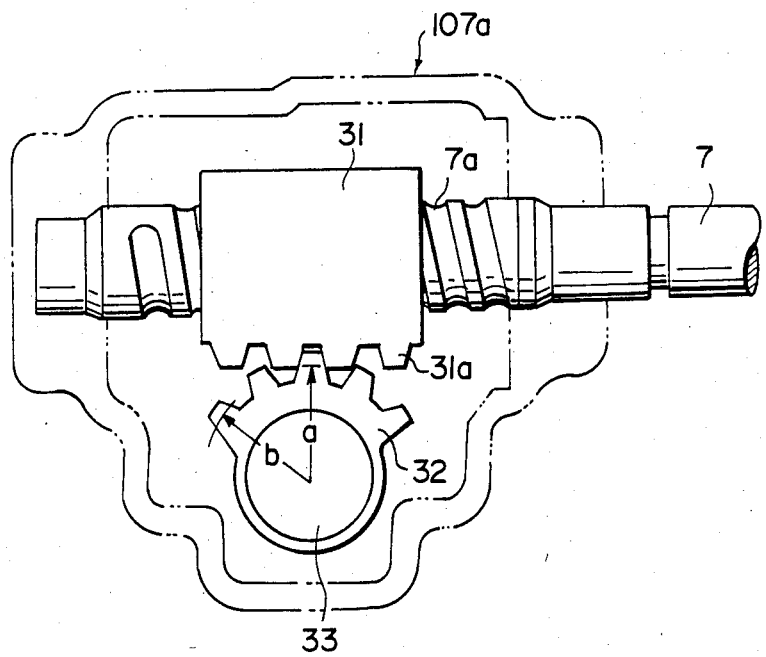
FIG. 8 is a fragmentary side view showing a preferred example of the steering gear device which can be employed in the steering system of the present invention.

When the steering gear device 107 is of a variable gear ratio type such as shown in FIG. 8, the controller 17 has only to control the steering ratio changing mechanism 1 according to the vehicle speed in order to obtain the steering ratio characteristics shown in FIG. 6 or 7. That is, in the variable gear ratio type steering gear device 107a, the gear ratio changes with the steering ratio. As shown in FIG. 8, the variable gear ratio type steering gear device 107a comprises a threaded portion 9a formed on the free end of the output shaft 9, a nut 31 which is in mesh with the threaded portion 9a by way a plurality of balls (not shown) and is provided with a rack 31a on the outer surface thereof, and a sector gear 32 which is fixed to a sector shaft 33 fixed to said pitman arm 103 and is in mesh with the rack 31a on the nut 31. When the output shaft 7 is rotated and the nut 31 is moved right or left as viewed in FIG. 8, the sector gear 32 is rotated together with the sector shaft 33 to swing the pitman arm 103. The sector gear 32 is a nonuniform gear and the pitch diameter of the sector gear 32 is the maximum at the center (indicated at a) and is reduced toward the ends (as represented by the pitch diameter indicated at b) so that the gear ratio is reduced (or the amount of rotation of the sector gear 32 is increased) as the amount of rotation of the output shaft 9 of the steering ratio changing mechanism 1 increases. Therefore, by properly selecting the pitch diameters represented by pitch diameters a and b, the steering ratio which has been changed according to the vehicle speed by the steering ratio changing mechanism 1 can be further changed according to the steering angle in accordance with the characteristics shown in FIGS. 6 or 7.

This arrangement is advantageous in that the controller 17 may be simple in structure since it is necessary for the controller 17 to control the steering ratio changing mechanism according only to the vehicle speed, whereby the steering ratio can be changed according to both the vehicle speed and the steering angle without substantially adding to the manufacturing cost.

Though the variable gear ratio steering gear device 107a shown in FIG. 8 is of a so-called ball-and-nut type, a so-called rack-and-pinion type variable gear ratio mechanism in which the pitch of the rack is nonuniform may be employed.

As described above, the planet-pinion carrier 13 is urged to the neutral position shown in FIGS. 2 and 3 by the spring 21. When the planet-pinion carrier 13 is driven by the step motor 15, the spring 21 resiliently extends and contracts to permit rotation of the carrier 13. If trouble occurs in the step motor 15, for example, and the carrier 13 is released, it would be impossible to transmit the rotation of the sun gear 9 to the ring gear 10 were it not for the spring 21. That is, when the step motor 15 becomes unable to constrain the carrier 13, the spring 21 holds the carrier 13 in the neutral position so that the sun gear 9, planet pinions 12 and the ring gear 10 function as a fixed gear train. Therefore, even if the step motor 15 or the controller 17 goes out of order and constraint of the carrier 13 is lost, the steering force can still be transmitted to the front wheels 106 to steer the vehicle.

I claim:

1. A steering system for a vehicle comprising a transmission ratio changing means which is inserted between the steering wheel and the steering gear device of the vehicle to change the transmission ratio to change the steering ratio and is in the form of a differential gear mechanism having an input gear element connected to the steering wheel, an output gear element connected to the steering gear device and a reaction force gear element; a vehicle speed detecting means; a steering angle detecting means; a controller which receives a vehicle speed signal from the vehicle speed detecting means and a steering angle signal from the steering angle detecting means and outputs a control signal; and an actuator which receives the control signal from the controller and controls rotation of the reaction force gear element to increase the transmission ratio to reduce the steering ratio as the vehicle speed increases.

2. A steering system as defined in claim 1 in which said differential gear mechanism comprises a planetary gear unit including a sun gear, a ring gear and a pinion.

3. A steering system as defined in claim 2 in which said sun gear is connected to the steering wheel, the ring is connected to the steering gear device and the pinion is operatively connected to the actuator.

4. A steering system as defined in claim 1 further comprising a spring means for urging the reaction force gear element to the neutral position.

5. A steering system as defined in claim 1 in which said steering gear device is of a variable gear ratio type in which the gear ratio changes with the steering angle.

6. A steering system as defined in claim 7 in which said controller controls the actuator to control rotation of the reaction force gear element so that the rate of change of the steering ratio with the vehicle speed is larger in a low vehicle speed range than in a high vehicle speed range.

7. A steering system as defined in claim 1 in which said controller controls the actuator to control rotation of the reaction force gear element so that the steering ratio is reduced as the vehicle speed increases and the rate of change of the steering ratio with the vehicle speed becomes smaller as the vehicle speed increases and as the steering angle increases.

8. A steering system for a vehicle comprising a transmission ratio changing means which is inserted between the steering wheel and the steering gear device of the vehicle to change the transmission ratio to change the steering ratio and is in the form of a differential gear mechanism having an input gear element connected to the steering wheel, an output gear element connected to the steering gear device and a reaction force gear element; a vehicle speed detecting means; a steering angle detecting means; a controller which receives a vehicle speed signal from the vehicle speed detecting means and a steering angle signal from the steering angle detecting means and outputs a control signal; and an actuator which receives the control signal from the controller and controls rotation of the reaction force gear element so that the steering ratio is reduced as the vehicle speed increases and the rate of change of the steering ratio with the vehicle speed becomes smaller as the vehicle speed increases and as the steering angle increases.

9. In a steering system for a vehicle, comprising a transmission ratio changing means inserted between the steering wheel and dirigible wheels of the vehicle to change the transmission ratio, thereby changing the steering ratio, a vehicle speed detecting means and a controller which receives a vehicle speed signal from the vehicle speed detecting means and controls the transmission ratio changing means to increase the transmission ratio to reduce the steering ratio as the vehicle speed increases, the improvement which comprises that said controller controls the transmission ratio changing means so that the rate of change of the steering ratio with the vehicle speed is larger in a low vehicle speed range than in a high vehicle speed range, according to the formula $$R = V^2/(\alpha + \beta V^2)$$

wherein R and V respectively represent the transmission ratio and the vehicle speed, and $\alpha$ and $\beta$ respectively represent constants which are the product of the gain of the lateral acceleration for a given steering angle and the wheel base of the vehicle and the product of the gain of the lateral acceleration for a given steering angle, the wheel base of the vehicle, and a stability factor.

10. In a steering system for a vehicle comprising a transmission ratio changing means inserted between the steering wheel and dirigible wheels of the vehicle to change the transmission ratio, thereby changing the steering ratio, a vehicle speed detecting means and a controller which receives a vehicle speed signal from the vehicle speed detecting means and controls the transmission ratio changing means to increase the transmission ratio to reduce the steering ratio as the vehicle speed increases, the improvement which comprises that said controller controls the transmission ratio changing means so that the rate of change of the steering ratio with the vehicle speed is larger in a low vehicle speed range than in a high vehicle speed range according to the formula $$R = \alpha' \cdot V^n + \beta'$$

wherein R and V respectively represent the transmission ratio and the vehicle speed, and $\alpha'$ and $\beta'$ respectively represent positive constants related to the gain of the lateral o>n>1.

11. In a steering system for a vehicle comprising a transmission ratio changing means inserted between the steering wheel and dirigible wheels of the vehicle to change the transmission ratio, thereby changing the steering ratio, a vehicle speed detecting means and a controller which receives a vehicle speed signal from the vehicle speed detecting means and controls the transmission ratio changing means to increase the transmission ratio to reduce the steering ratio as the vehicle speed increases, the improvement which comprises that said controller controls the transmission ratio changing means so that the rate of change of the steering ratio with the vehicle speed is larger in a low vehicle speed range than in a high vehicle speed range according to the formula $$R = V/(\gamma + \delta V^2)$$

wherein R and V respectively represent the transmission ratio and the vehicle speed, and $\gamma$ and $\delta$ respectively represent constants which are the product of the gain of the yaw rate for a given steering angle and the wheel base of the vehicle, and the product of the gain of the yaw rate for a given steering angle, the wheel base of the vehicle and a stability factor.

12. A steering system for a vehicle comprising a transmission ratio changing means inserted between the steering wheel and dirigible wheels to change the transmission ratio, thereby changing the steering ratio, a vehicle speed detecting means, a steering angle detecting means and a controller which receives a vehicle speed signal from the vehicle speed detecting means and a steering angle signal from the steering angle detecting means and controls the transmission ratio changing means so that the steering ratio is reduced as the vehicle speed increases and the rate of change of the steering ratio with the vehicle speed becomes smaller as the vehicle speed increases and as the steering angle increases, said steering ratio being preset at a given turning angle of the steering wheel and changing along a characteristic line in which the steering ratio decreases as the vehicle speed becomes higher, each characteristic line being set such that the steering ratio at a given vehicle speed decreases as the turning angle of the steering wheel becomes larger.

* * * * *